(12) United States Patent
Iimura

(10) Patent No.: US 6,621,608 B2
(45) Date of Patent: Sep. 16, 2003

(54) SCANNING OPTICAL APPARATUS

(75) Inventor: Hidehiro Iimura, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 09/944,139

(22) Filed: Sep. 4, 2001

(65) Prior Publication Data

US 2002/0027697 A1 Mar. 7, 2002

(30) Foreign Application Priority Data

Sep. 5, 2000 (JP) .......................................... 2000-269245

(51) Int. Cl.⁷ ............................................... G02B 26/08
(52) U.S. Cl. ....................... 359/196; 359/198; 359/212; 359/216; 347/256; 347/263
(58) Field of Search ................................ 359/196–221, 359/226; 347/241–244, 256–261, 263

(56) References Cited

U.S. PATENT DOCUMENTS 5,506,719 A * 4/1996 Murakami et al. .......... 359/216

* cited by examiner

*Primary Examiner*—James Phan
(74) *Attorney, Agent, or Firm*—Fitzpatrick, Cella, Harper & Scinto

(57) ABSTRACT

An object of the present invention is to provide a scanning optical apparatus that has a light source emitting a light beam deflecting and scanning device for deflecting and scanning the light beam emitted from the light source, a frame body provided with a side wall and containing the light source and the deflecting and scanning device therein, and a supporting member for supporting the frame body, the frame body having a fixed portion fixed to and supported by the supporting member, and an overhanging portion overhanging from the fixed portion, the side wall having a cut-away portion between the fixed portion and the overhanging portion.

13 Claims, 7 Drawing Sheets

SCANNING OPTICAL APPARATUS

BACKGROUND OF THE INVENTION

1. Field of the Invention

This invention relates to a scanning optical apparatus usable in an image forming apparatus such as a laser beam printer or a digital copier.

2. Description of the Related Art

A scanning optical apparatus of this kind is constructed as shown, for example, in FIG. 13 of the accompanying drawings, and in the interior of a frame 1 made of synthetic resin, there are disposed a light source unit 2, a cylinder lens 3, a deflecting and scanning unit 4, scanning lenses 5a, 5b, a turn-back mirror 6, a light detecting unit 7, a reflecting mirror 8, etc. The frame 1 has a peripheral wall 1a for preventing a laser beam from emerging to the outside, and a plurality of mounting holes 1b for fixing means, and the upper opening of the frame 1 is adapted to be closed by a lid.

Such a scanning optical apparatus, as shown in FIG. 14 of the accompanying drawings, is mounted for use on an image forming apparatus as a host apparatus. The frame 1 of the scanning optical apparatus and the frame F of the image forming apparatus are fixed to each other by screws 9 inserted in the mounting holes 1b. A process cartridge P provided with a photosensitive drum D is incorporated in the frame of the image forming apparatus so as to be located below the scanning optical apparatus.

The laser beam emitted from the light source unit 2 is transmitted through the cylinder lens 3, is deflected by the deflecting and scanning unit 4, is transmitted through the scanning lenses 5a and 5b, and thereafter is reflected by the turn-back mirror 6, and emerges from the emergence port 1c of the frame 1 toward the photosensitive drum D and forms a latent image on the surface of the photosensitive drum D.

Also, before it emerges toward the photosensitive drum D, the laser beam is reflected by the reflecting mirror 8 upstream with respect to the main scanning direction and enters the light detecting unit 7. An electrical signal from the light detecting unit 7 is adapted to determine the timing of the start of image recording, and the image forming apparatus receives the input of the electrical signal from the light detecting unit 7, and forms and outputs an image in operative association with the scanning optical apparatus.

In the conventional scanning optical apparatus, however, the mounted shapes of optical parts are diversified and therefore, the shape of the frame 1 is complicated. Also, the frame F of the conventional image forming apparatus limits the locations of the mounting holes 1b of the scanning optical apparatus and maldistributes them relative to the configuration of the scanning optical apparatus, in order to secure a space for containing the process cartridge P therein. Therefore, in the frame 1 after the scanning optical apparatus is incorporated into the image forming apparatus, there exist a fixed portion 1A surrounded by the mounting holes 1b and fixed to the image forming apparatus, and an overhanging portion 1B of cantilever structure overhanging from this fixed portion 1A into the air.

When the deflecting and scanning unit 4 is operated in such a state, the frame 1 vibrates in response to the vibration of this deflecting and scanning unit 4. In this case, the vibration occurring in each portion of the frame 1 does not become uniform because the mounted shapes of the optical parts are diversified and the shape of the frame 1 is complicated. Accordingly, vibrations from multiple directions are combined in the frame 1 and for example, a localized resonance phenomenon occurs to the protruding portion. That is, the overhanging portion 1B of the frame 1 overhangs as cantilever structure and therefore, resonance occurs there at a relatively low frequency.

Specifically, the overhanging portion 1B of the frame 1 is great in volume and weight and moreover is of cantilever structure and therefore may in some cases cause resonance at a relatively low frequency, e.g. 500 Hz or less. In contrast, the rotational frequency of the deflecting and scanning unit 4 often exceeds 300 Hz with the tendency toward a higher speed in recent years, and may often approximate to the resonance frequency of the overhanging portion 1B of the frame 1.

Accordingly, when resonance occurs in the overhanging portion 1A at a frequency approximate to the rated rotation of the deflecting and scanning unit 4, the vibration of the scanning optical apparatus increases during print output and at the same time, great vibration also propagates to the image forming apparatus. This vibration deviates the relative relation between the position of the laser beam emitted from the scanning optical apparatus and the position of the photosensitive drum D positioned in the frame, causes uneven pitch to a print-outputted image and deteriorates the quality of the image.

SUMMARY OF THE INVENTION

It is an object of the present invention to provide a scanning optical apparatus in which the vibration of the overhanging portion of a frame is suppressed to thereby improve the quality of image.

It is another object of the present invention to provide a scanning optical apparatus comprising a light source emitting a light beam, deflecting and scanning means for deflecting and scanning the light beam emitted from the light source, a frame body provided with a side wall and containing the light source and the deflecting and scanning means therein, and a supporting member for supporting the frame body, the frame body having a fixed portion fixed to and supported by the supporting member, and an overhanging portion overhanging from the fixed portion, the side wall having a cut-away portion between the fixed portion and the overhanging portion.

Further objects of the present invention will become apparent from the following description.

DESCRIPTION OF THE PREFERRED EMBODIMENTS

The present invention will hereinafter be described in detail with respect to embodiments thereof shown in FIGS. 1 to 12.

Figure 1:
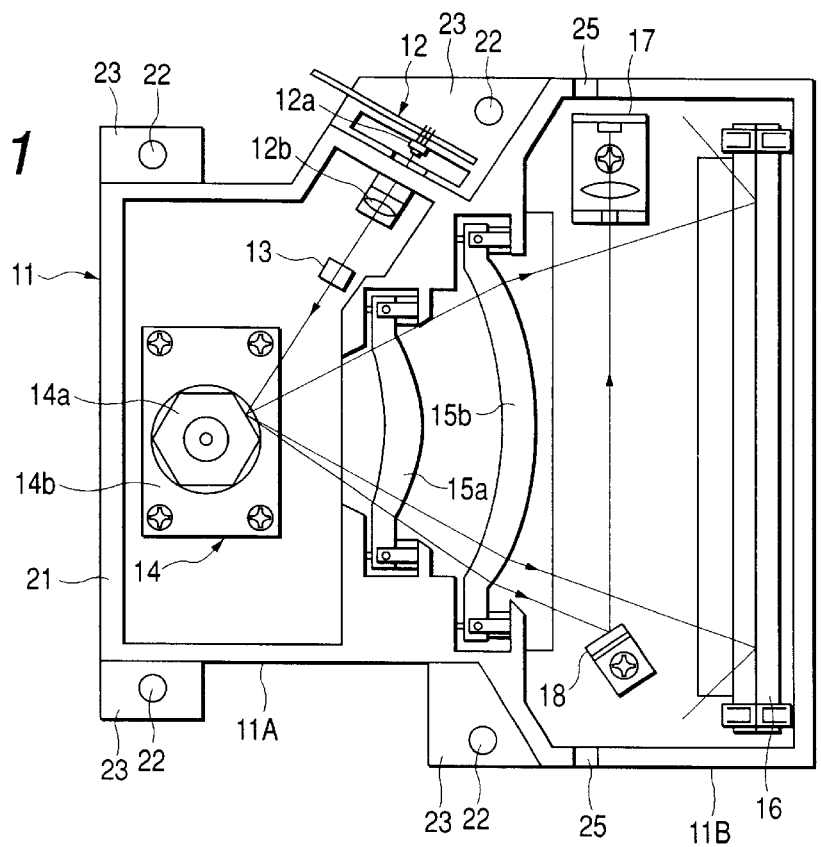
FIG. 1 is a plan view of a scanning optical apparatus which is a first embodiment.
Figure 2:
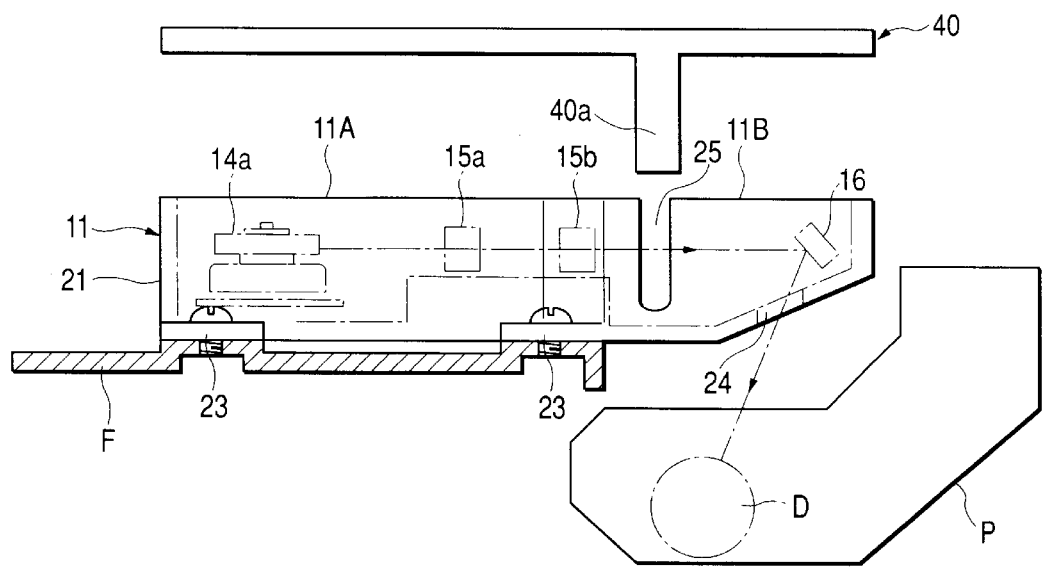
FIG. 2 is a side view of the scanning optical apparatus of FIG. 1.

FIG. 1 is a typical plan view of a scanning optical apparatus which is a first embodiment, and FIG. 2 is a side view thereof, and the frame (frame body) 11 of the scanning optical apparatus is integrally molded from a synthetic resin material by the metal mold of an injection molding machine, and the scanning optical apparatus is adapted to be mounted for use on an image forming apparatus as a host apparatus. In a state in which the scanning optical apparatus is mounted on a frame F which is the supporting member of the image forming apparatus, the left side of the frame 11 is a first portion (fixed portion) 11A fixed to the image forming apparatus, and the remaining portion thereof is a second portion (overhanging portion) 11B overhanging in the shape of cantilever structure into the air. A process cartridge P is adapted to be incorporated into the image forming apparatus so as to be located below the scanning optical apparatus, and the process cartridge P is provided with a photosensitive drum D.

The frame 11 has mounted thereon a light source unit 12 having a semiconductor laser source 12a, a collimator lens 12b, etc. made into a unit. In the direction of travel of a laser beam emitted from the light source unit 12 in the interior of the frame 11, there are disposed a cylinder lens 13 for compressing the laser beam from the light source unit 12 in the sub-scanning direction perpendicular to a deflecting and scanning plane, and a deflecting and scanning unit 14 which is deflecting and scanning means for deflecting and scanning the laser beam from the cylinder lens 13. The deflecting and scanning unit 14 is comprised of a polygon mirror 14a on which the laser beam from the cylinder lens 13 is imaged, and a driving motor 14b for rotatively driving this polygon mirror 14a.

Also, in the direction of travel of the laser beam deflected and scanned in the frame 11 by the deflecting and scanning unit 14, there are disposed scanning lenses 15a, 15b for imaging the laser beam from the deflecting and scanning unit 14 on the surface of the photosensitive drum D and also making the scanning speed of the laser beam on the surface of the photosensitive drum D constant, a turn-back mirror 16 for turning back the laser beam from these scanning lenses 15a, 15b toward the photosensitive drum D, a light detecting unit 17 having a sensor for detecting the laser beam and a lens or the like made into a unit, and a reflecting mirror 18 for directing the laser beam to this light detecting unit 17. The upper opening of the frame 11 is closed by a cover 40.

Such optical parts as the cylinder lens 13, the scanning lenses 15a, 15b, the turn-back mirror 16 and the reflecting mirror 18 are provided in the optical path of the light beam emitted from the light source unit 12.

The cylinder lens 13, the deflecting and scanning unit 14, the scanning lenses 15a, 15b, the turn-back mirror 16, the light detecting unit 17 and the reflecting mirror 18 are assembled to the frame 11 and are fixed by part fixing means such as screws and fittings. The cylinder lens 13 is fixed after focus-adjusted on a seat surface having high surface accuracy. Also, the scanning lenses 15a, 15b and the turn-back mirror 16 are fixed at the vicinity of the longitudinally opposite ends thereof outside the range of scanning angle.

A side wall 21 is provided on the frame 11 in such a manner as to surround the optical parts to thereby provide a peripheral wall so as to prevent the laser beam from emerging to the outside, and the side wall 21 stands in a direction substantially perpendicular to the scanning plane by the deflecting and scanning unit. On the first portion 11A of the frame 11, for example, four mounting portions 23 having mounting holes 22, respectively, are provided at some intervals so as to surround the first portion 11A outside the side wall 21. The bottom wall of the frame 11 is formed with an emergence port 24 for permitting the laser beam from the turn-back mirror 16 to emerge toward the photosensitive drum D therethrough.

Figure 3:
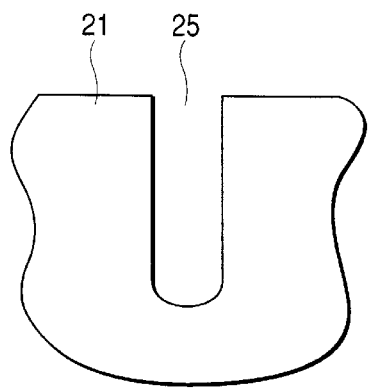
FIG. 3 is a side view showing the shape of a cut-away.

In the present embodiment, the turn-back mirror 16 is provided in the second portion 11B which is the overhanging portion. Between the first portion 11A and the second portion 11B, cut-aways 25 for suppressing the resonance of the second portion 11B are formed at two symmetrical locations in the side wall 21 of the frame 11. that is, cut-aways 25 of such a side shape as shown also in FIG. 3 are formed on the write-beginning side and the write-ending side, respectively, in the scanning direction of the laser beam. These cut-aways 25 are cut in vertically downwardly from the upper surface of the side wall 21, and preferably the depth of each cut-away 25 is about ½ of the height of the side wall or greater, and the corners of the bottom of each cut-away 25 are rounded.

Figure 15:
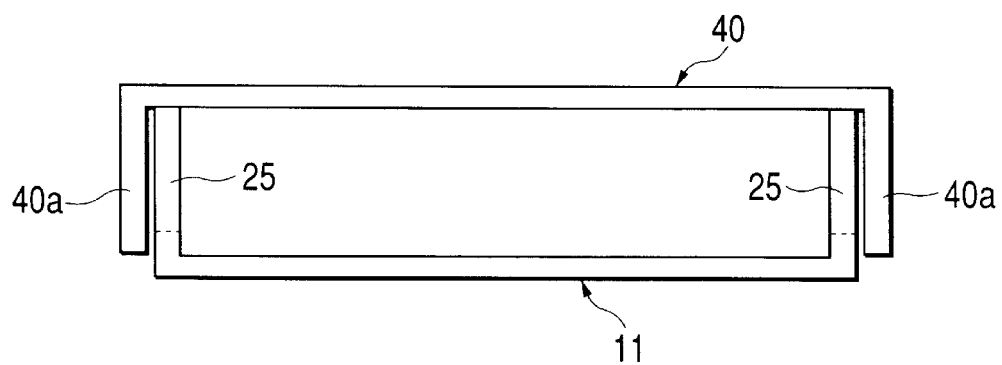
FIG. 15 shows the positional relation between a cut-away portion 25 and the rib 40a of a cover in the scanning optical apparatus of FIG. 2.

The cross-sectional dimension and length of the turn-back mirror 16 are suitably selected and the natural frequency of the turn-back mirror 16 is prevented from approximating to the rated rotation frequency of the deflecting and scanning unit 14 and resonating. Also, as shown in FIG. 15, a rib 40a which is a protruding portion for horizontally closing the cut-aways 25 is formed on the cover 40 covering the upper opening of the frame 11 outside the side wall 21, whereby the laser beam is prevented from emerging from the cut-aways 25 to the outside.

In this scanning optical apparatus, the laser beam emitted from the laser source 12a of the light source unit 12 is transmitted through the collimator lens 12b and becomes parallel light, and is transmitted through the cylinder lens 13 and is reflected by the rotating polygon mirror 14a. The laser beam is then reflected by the turn-back mirror 16 after it is transmitted through the scanning lenses 15a and 15b, and emerges from the emergence port 24 of the frame 11 toward the photosensitive drum D, and forms a latent image on the surface of the photosensitive drum D.

Also, the laser beam reflected by the polygon mirror 14a is reflected by the reflecting mirror 18 upstream with respect to the main scanning direction before it emerges toward the photosensitive drum D, and enters the light detecting unit 17. An electrical signal from the light detecting unit 17 is adapted to determine the timing of the start of image recording, and the image forming apparatus receives the electrical signal from the light detecting unit 17, and forms and outputs an image in operative association with the scanning optical apparatus.

Figure 4:
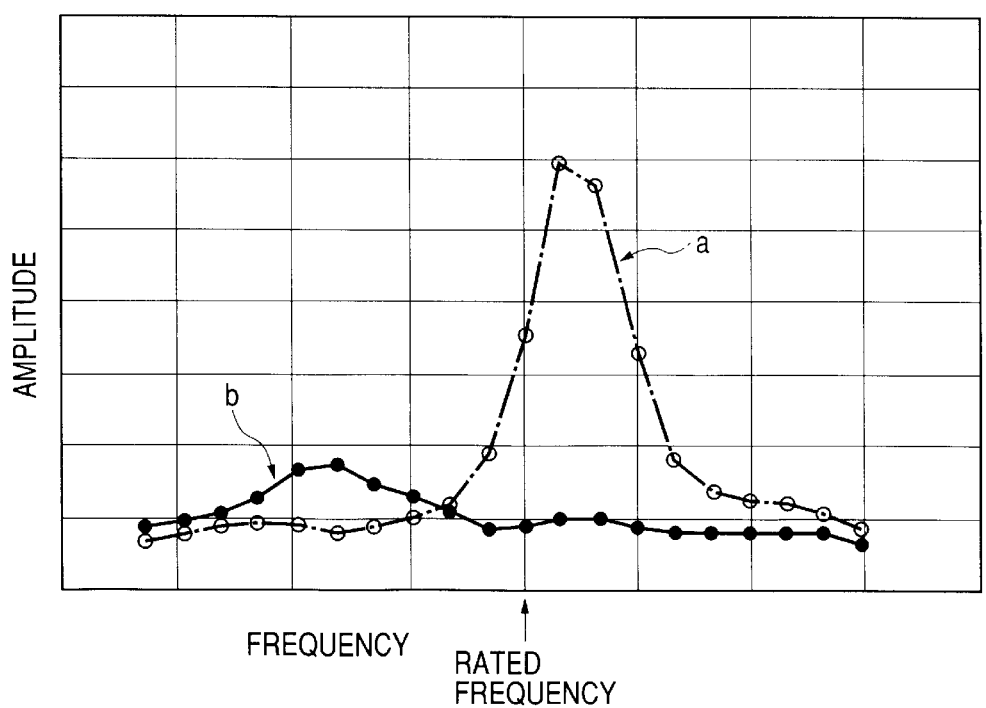
FIG. 4 is a graph illustrating the effect of the cut-away.

FIG. 4 is a graph showing the result of the experiment of the vibration of the second portion 11B by frequency vs. amplitude, and a case where the cut-aways 25 are not provided is indicated by polygonal line a, and a case where the cut-aways 25 are provided is indicated by polygonal line b. In the experiment, the rotation frequency of the deflecting and scanning unit 14 which is a vibration source is varied and the magnitude of the vibration at the representative point of the second portion 11B is measured. The experiment data are simplified and made into a graph, and the high crests indicate the occurrence of resonance.

As can be seen from this graph, in the case when the cut-aways 25 are not provided, the rated number of revolutions is approximate to the resonance frequency as indicated by the polygonal line a and therefore, when the resonance frequency shifts even slightly due to changes in the mounted states of the optical parts and the uneven thickness or the like of the frame 11, the amplitude increases further. In contrast, in the case where the cut-aways 25 are provided, resonance does not occur as indicated by the polygonal line b, and the amplitude at the rated number of revolutions decreases to about ¼ of that in the case where the cut-aways 25 are not provided.

As described above, in the first embodiment, the cut-aways 25 are provided in the side wall 21 between the first portion 11A and the second portion 11B and therefore, the rigidity of the second portion 11B against vibration can be decreased and the appearance of resonance can be moved to a lower frequency. That is, the propagated state of vibration can be changed on the way from the deflecting and scanning unit 14 which is a vibration source to the second portion 11B to thereby prevent the resonance frequency of the second portion 11B from approximating to the rated number of revolutions of the deflecting and scanning unit 14.

Accordingly, when the scanning optical apparatus is mounted on the image forming apparatus and used, it becomes possible to suppress the positional deviation of the laser beam on the surface of the photosensitive drum D, and improve the quality of image without causing uneven pitch to an image.

Also, the cut-aways 25 can be formed at a time at the injection molding step of the frame 11 and therefore, any special part as a countermeasure for vibration is not required and thus, the curtailment of the manufacturing cost by the curtailment of the cost of parts and the reduction in the number of the assembling steps becomes possible.

Figure 5:
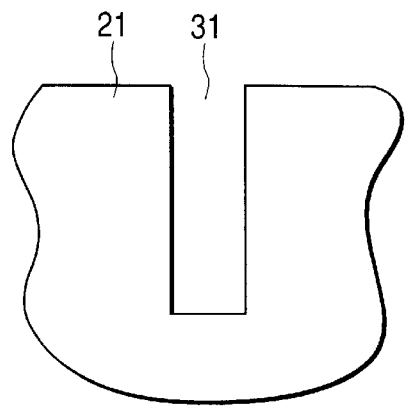
FIG. 5 is a side view showing the shape of a cut-away.
Figure 6:
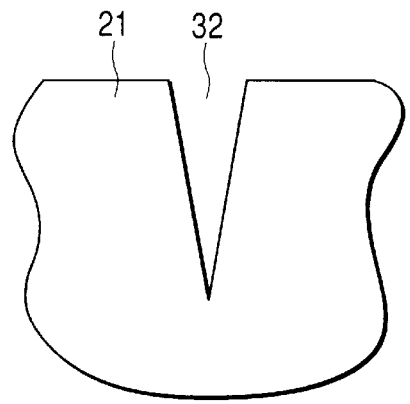
FIG. 6 is a side view showing the shape of a cut-away.
Figure 7:
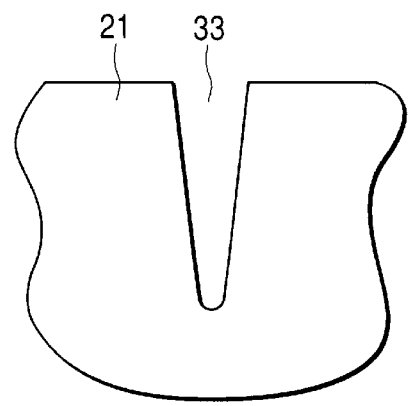
FIG. 7 is a side view showing the shape of a cut-away.
Figure 8:
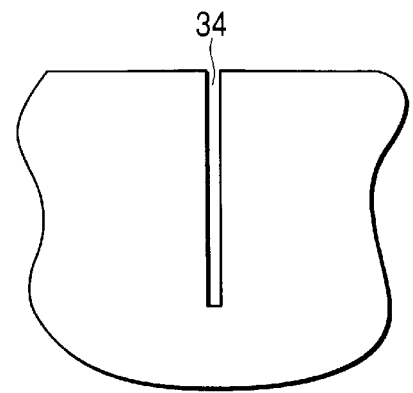
FIG. 8 is a side view showing the shape of a cut-away.

The U-shaped cut-away 25 having the rounded corners can be replaced by a substantially U-shaped cut-away 31 having unrounded corners as shown in FIG. 5. Also, if it is replaced by a V-shaped cut-away 32 wider at the opening side that at the bottom side as shown in FIG. 6, or a substantially V-shaped cut-away 33 having a rounded bottom as shown in FIG. 7, the mold releasing property at the molding step of the frame 11 can be improved. Further, if it is replaced by a slit-shaped cut-away 34 as shown in FIG. 8, the entry of dust into the interior of the frame 11 can be more suppressed.

Figure 9:
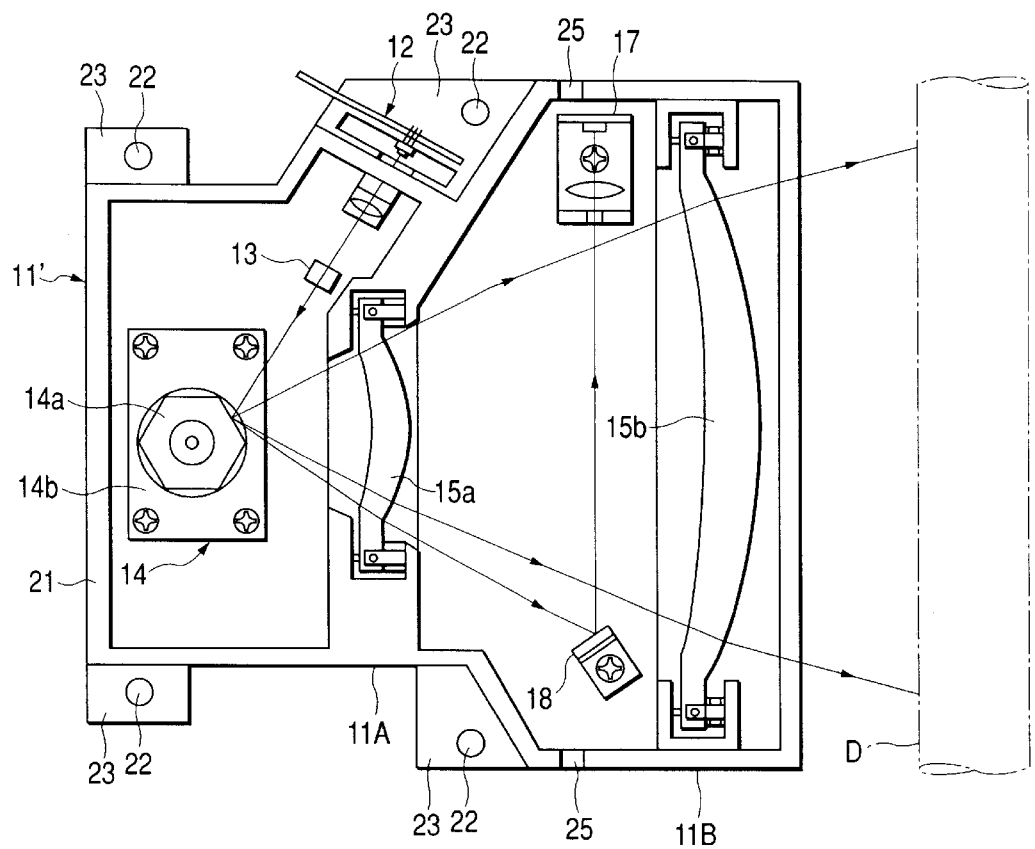
FIG. 9 is a plan view of a scanning optical apparatus which is a second embodiment.
Figure 10:
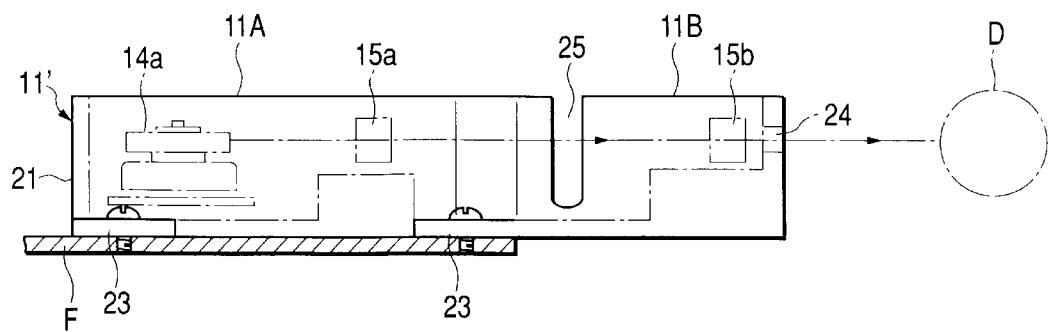
FIG. 10 is a side view of the scanning optical apparatus of FIG. 9.

FIGS. 9 and 10 show a second embodiment, and a frame 11' has cut-aways 25 at locations similar to those in the first embodiment, and the side wall 21 has an emergence port 24. The turn-back mirror 16 in the first embodiment is eliminated, and one scanning lens 15b is provided at the location whereat the turn-back mirror 16 was provided, and the rotary drum D is disposed on the scanning plane of the laser beam passed through the scanning lens 15b and the emergence port 24.

Again in this second embodiment, the first portion 11A is fixed to the image forming apparatus and the second portion 11B overhangs in the shape of cantilever structure in the air. In the present embodiment, the scanning lens 15b is provided in the second portion 11B which is the overhanging portion.

Again in the present embodiment, the cut-aways 25 are provided in the side wall between the first portion 11A and the second portion 11B, whereby there is obtained an effect similar to that of the first embodiment.

Figure 11:
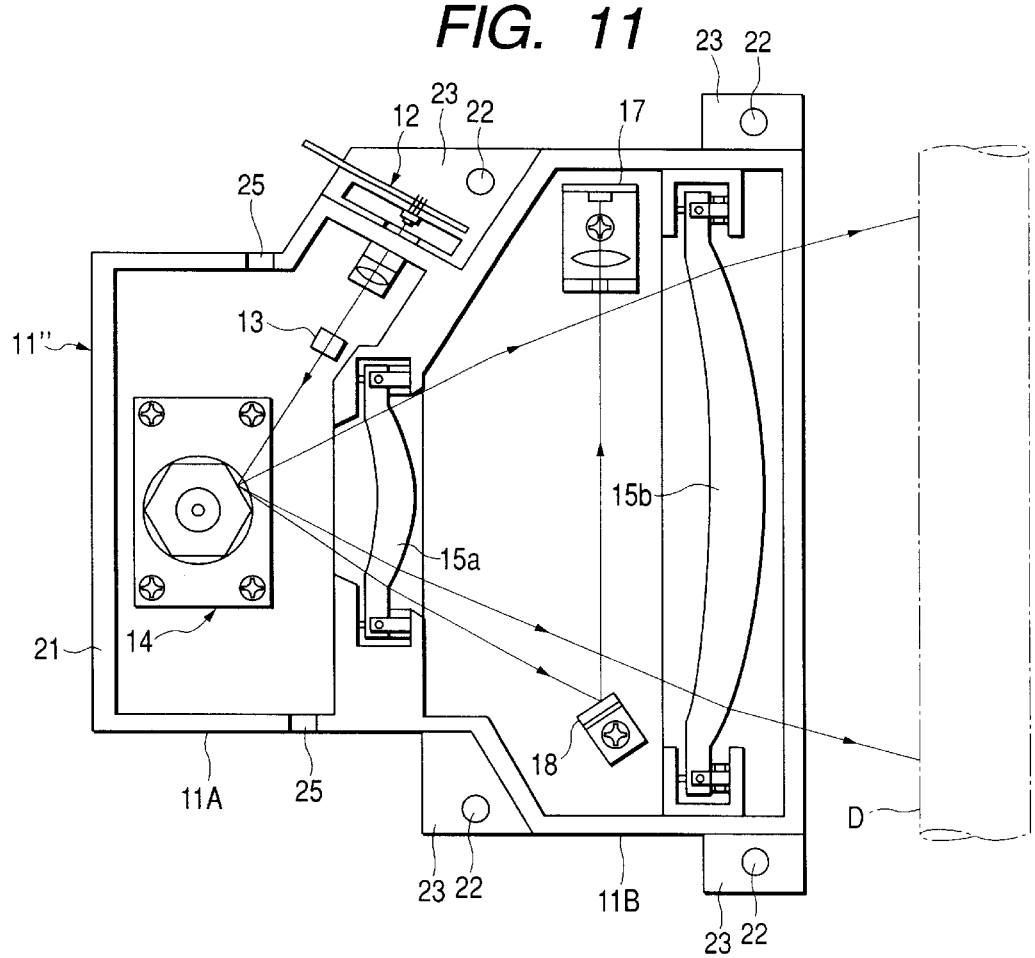
FIG. 11 is a plan view of a scanning optical apparatus which is a third embodiment.
Figure 12:
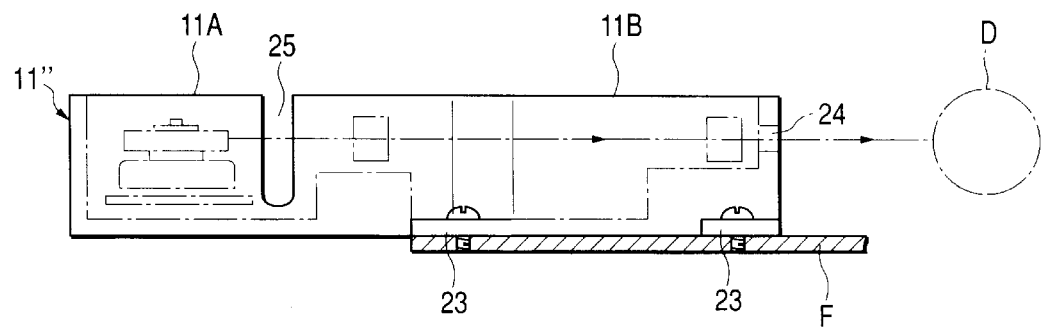
FIG. 12 is a side view of the scanning optical apparatus of FIG. 11.
Figure 13:
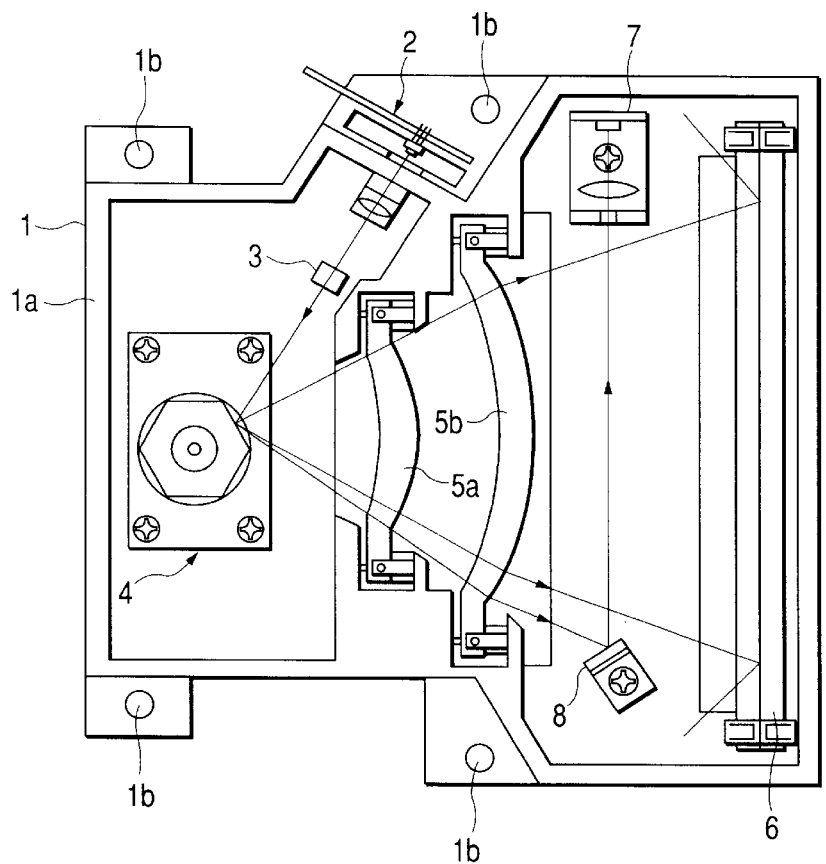
FIG. 13 is a plan view of a conventional scanning optical apparatus.
Figure 14:
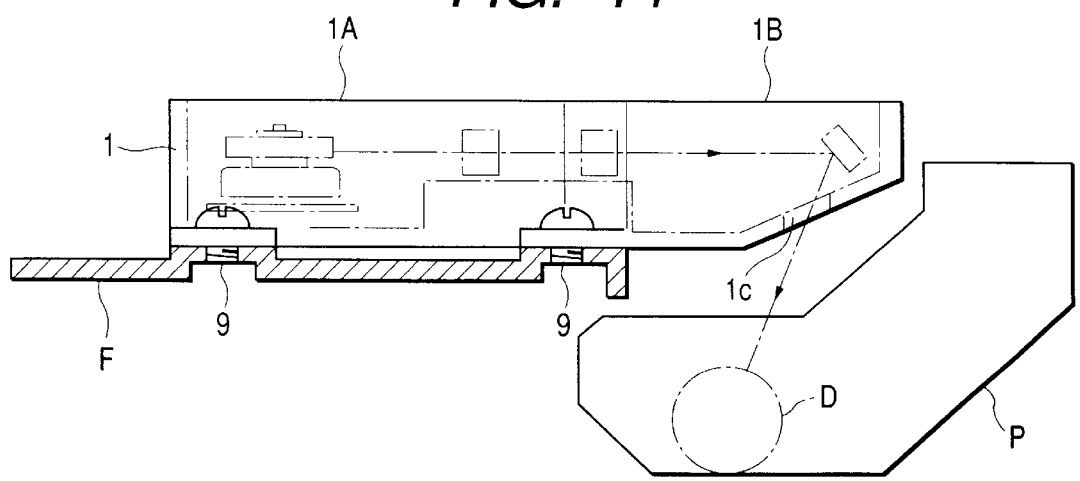
FIG. 14 is a side view of the scanning optical apparatus of FIG. 13.

FIGS. 11 and 12 shows a third embodiment, and the mounting holes 22 and mounting portions 23 of a frame 11" are shifted from the first portion 11A to the second portion 11B, and the cut-aways 25 are formed in the side wall 21 between the first portion 11A and the second portion 11B.

In this third embodiment, not the first portion 11A but the second portion 11B is fixed to the image forming apparatus and the first portion 11A overhangs in the shape of cantilever structure in the air. In the present embodiment, the deflecting and scanning unit 14 is provided in the first portion 11A which is the overhanging portion.

Again in the present embodiment, the cut-aways 25 are provided in the side wall between the first portion 11A and the second portion 11B, whereby there is obtained an effect similar to that of the first embodiment.

While in the above-described first to third embodiments, the cut-aways 25 are cut in the vertical direction, they may be inclined from the vertical direction. Also, the locations of the cut-aways 25 need not be restricted to the above-described locations, but the cut-aways 25 may be provided at locations effective to prevent the vibration of the second portion 11B in the first and second embodiments, and at locations effective to prevent the vibration of the first portion 11A in the third embodiment. Also, while the cut-aways 25 are provided symmetrically at two locations on the write-beginning side and the write-ending side in the scanning direction, the locations need not be restricted to two locations and symmetry, but a single location may sufficiently function in some cases, and the cut-aways can also be provided at three or more locations.

As described above, in the scanning optical apparatus according to the present invention, the cut-aways are provided in the side wall between the fixed portion and the overhanging portion and therefore, the rigidity of the overhanging portion against vibration can be decreased and the appearance of resonance can be moved to a lower frequency, and the vibration of the overhanging portion can be suppressed. Also, any special member for suppressing vibration is not required and therefore, a reduction in cost becomes possible.

Accordingly, when the scanning optical apparatus is mounted on the image forming apparatus and used, no uneven pitch is caused to an image and the quality of image can be improved, and this greatly contributes to the higher performance and lower price of the image forming apparatus.

While the embodiments of the present invention have been described above, the present invention is not restricted to the above-described embodiments, but all modifications are possible within the technical idea of the present invention.

What is claimed is:

1. A scanning optical apparatus comprising:
   a light source emitting a light beam;
   deflecting and scanning means for deflecting and scanning the light beam emitted from said light source;
   a frame body provided with a side wall and containing said light source and said deflecting and scanning means therein; and
   a supporting member for supporting said frame body;
   said frame body having a fixed portion fixed to and supported by said supporting member, and an overhanging portion overhanging from said fixed portion;
   said side wall having a cut-away portion between said fixed portion and said overhanging portion.

2. A scanning optical apparatus according to claim 1, wherein said frame body has a plurality of mounting portions near a marginal edge of the fixed portion.

3. A scanning optical apparatus according to claim 1, wherein said side wall surrounds said light source and said deflecting and scanning means.

4. A scanning optical apparatus according to claim 1, wherein said side wall is substantially perpendicular to a scanning plane by said deflecting and scanning means.

5. A scanning optical apparatus according to claim 1, further comprising an optical member provided in an optical path of the light beam, and said optical member is provided in said overhanging portion.

6. A scanning optical apparatus according to claim 5, wherein said optical member is a mirror.

7. A scanning optical apparatus according to claim 5, wherein said optical member is a lens.

8. A scanning optical apparatus according to claim 1, wherein said deflecting and scanning means is provided in said overhanging portion.

9. A scanning optical apparatus according to claim 1, wherein said cut-away portion has a depth of ½ or greater of a height of said side wall.

10. A scanning optical apparatus according to claim 1, wherein said cut-away portion is U-shaped or substantially U-shaped.

11. A scanning optical apparatus according to claim 1, wherein said cut-away portion is V-shaped or substantially V-shaped.

12. A scanning optical apparatus according to claim 1, wherein said cut-away portion is slit-shaped.

13. A scanning optical apparatus according to claim 1, further comprising a lid member for closing an upper opening of said frame body, and said lid member has a portion for preventing the light beam from emerging from said cut-away portion to an outside.

* * * * *